United States Patent
Kusano et al.

[11] Patent Number: 5,576,848
[45] Date of Patent: Nov. 19, 1996

[54] IMAGE READING APPARATUS WHICH COMPARES MARGIN WIDTH OUTSIDE IMAGE AREA OF ORIGINAL IMAGE ON SHEET WITH WIDTH OF SEPARATE IMAGE FOR SYNTHESIS AND PRINTING OF IMAGES

[75] Inventors: Hideaki Kusano, Isehara; Hiroshi Miura, Yokohama, both of Japan

[73] Assignee: Minolta Co., Ltd., Osaka, Japan

[21] Appl. No.: 313,565

[22] Filed: Sep. 27, 1994

[30] Foreign Application Priority Data

Oct. 12, 1993 [JP] Japan .................................... 5-254310

[51] Int. Cl.⁶ .............................. H04N 1/387; H04N 393
[52] U.S. Cl. .......................... 358/449; 358/450; 358/451
[58] Field of Search ..................... 358/449, 550, 358/451, 452, 448, 468; 382/284, 295, 298, 297

[56] References Cited

U.S. PATENT DOCUMENTS 5,276,533  1/1994  Shimizu et al. ......................... 358/448
5,467,203  11/1995 Kawata ................................... 358/451

Primary Examiner—Scott A. Rogers
Attorney, Agent, or Firm—Burns, Doane, Swecker & Mathis, LLP

[57] ABSTRACT

This invention realizes synthesis of an image of an original document (an original image) with a separate image composed of a row of characters. The possibility that the original image and the separate image will overlap each other when the original image is printed on a sheet is precluded by the present invention using a procedure which comprises comparing the size of the sheet with the size of the original image (size of sheet>size of original image) and shifting (adjusting) the position for printing the original image or, when necessary, further contracting the original image or the separate image so that the separate image may be contained by way of synthesis in the part of a margin of the sheet appearing as the difference between the size of the sheet and the size of the original image prior to the printing of the original image on the sheet.

12 Claims, 13 Drawing Sheets p  q

IMAGE READING APPARATUS WHICH COMPARES MARGIN WIDTH OUTSIDE IMAGE AREA OF ORIGINAL IMAGE ON SHEET WITH WIDTH OF SEPARATE IMAGE FOR SYNTHESIS AND PRINTING OF IMAGES

BACKGROUND OF THE INVENTION

This invention relates to an image reading apparatus which is capable of synthesizing an original image previously read in with another image such as of characters and emitting the product of synthesis as an output.

Heretofore, a digital micro-reader printer (DMP) has been known as an image reading apparatus for reading such original documents as image frames photographed as in a microfilm. The reader printers of this class produce images on a screen or printed images on a paper for reading or viewing by a procedure which comprises projecting a beam of light from a light source through a condenser lens on the image of a selected one of the original documents serially photographed in a microfilm loaded on a microfilm carrier, subjecting to adjustment of focus and adjustment of magnification the beam of light which has passed through the microfilm by means of a projecting lens, and projecting the consequently adjusted beam of light on a screen or converting the beam of light into an electric signal by means of a line sensor and supplying the electric signal as to a laser beam printer.

Among the reader printers of this class is counted a reader printer which is endowed with a function of synthesizing an image read out of a microfilm (microimage) with another image as of characters and figures of date and time introduced from a personal computer and printing out the product of synthesis. FIG. 13A, for example, shows a microimage which is projected on a screen 11. The symbols "p" and "q" used in the diagram stand respectively for an area of the microimage on the screen 11 and an area other than that. FIG. 13B shows an image which is obtained when the microimage is read out by a line sensor such as the CCD, processed as normally required, and printed out on a sheet M. FIG. 13C depicts a case of synthesizing the image shown in FIG. 13B with a row of characters introduced as from a personal computer and printing out the product of synthesis.

Since the conventional image reading apparatus of this kind has the sole function of simply synthesizing a microimage read out of a microfilm with another image such as of a row of characters, however, it is at a disadvantage in incurring the possibility of the image area of the microimage overlapping the row of characters, depending on the size of the microimage to be read out, the margin of the microimage, the position of the microfilm to be read out, and the size of the row of characters (length, number of lines, etc.) to be synthesized, and the produced image betraying a missing part (refer to FIG. 13C).

Heretofore, for the sake of precluding the occurrence of such a missing part in the output image, it has been customary to adopt a method which comprises causing the operator of the apparatus to adjust manually the position of the microfilm or to alter manually the ratio of magnification of projection of the microfilm so that the non-image area of the microimage may fit in the area assigned for the insertion of the row of characters during the course of synthesis, for example. These methods, however, prove inconvenient for the operator because the position of the microfilm or the ratio of magnification must be readjusted each time the size of the row of characters being used in the synthesis is changed or the ratio of photographing the microfilm is changed.

SUMMARY OF THE INVENTION

An object of this invention is to provide an image reading apparatus which is capable of automatically synthesizing the original image read out of a microfilm with a separate image as of characters without inducing the occurrence of a missing part and emitting the product of synthesis.

To accomplish the object described above, this invention provides an image reading apparatus for synthesizing an original image with a separate image and emitting the synthesized image in such a manner as to be printed on a sheet, comprising a detector which detects a width of a margin outside the original image appearing as the difference between the sheet and the original image when the original image is printed on the sheet, a comparator which compares a width of the separate image subjected to synthesis with the width of the margin outside the original image detected by said detector, and a controller which shifts and emits as an output the position for printing the original image based on the result of the comparison by said comparator.

BRIEF DESCRIPTION OF THE DRAWINGS

The present invention will be better understood and objects other than those set forth above will become apparent when consideration is given to the following detailed description thereof. The description makes reference to the annexed drawings wherein.

DETAILED DESCRIPTION OF THE INVENTION

Now, embodiments of this invention will be described in detail below with reference to the accompanying drawings. Here, it is assumed that the image reading apparatus of this invention is applied to a microfilm reader scanner.

Figure 1:
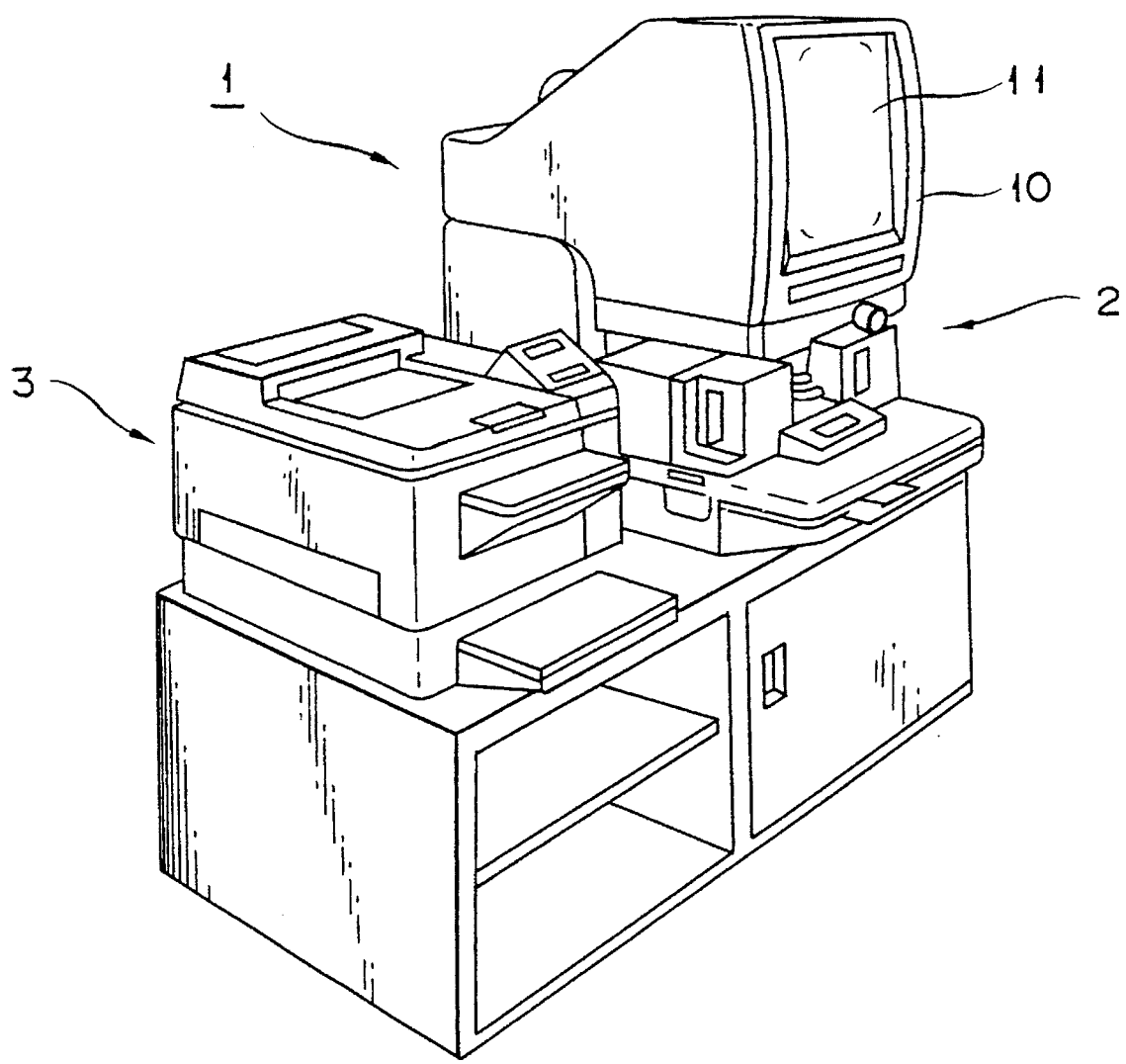
FIG. 1 is a perspective view of a digital micro-reader printer which uses an image reading apparatus of this invention.

FIG. 1 is a perspective view of a digital micro-reader printer to which the image reading apparatus of this invention is applied. This digital micro-reader printer 1 is constructed by combining a microfilm reader scanner 2 and a laser beam printer (LBP) 3. The microfilm reader scanner 2 is a device for reading the image of a desired one of the original documents photographed serially in a microfilm and the laser beam printer 3 is a device for printing the image data so read out on a paper.

Figure 2:
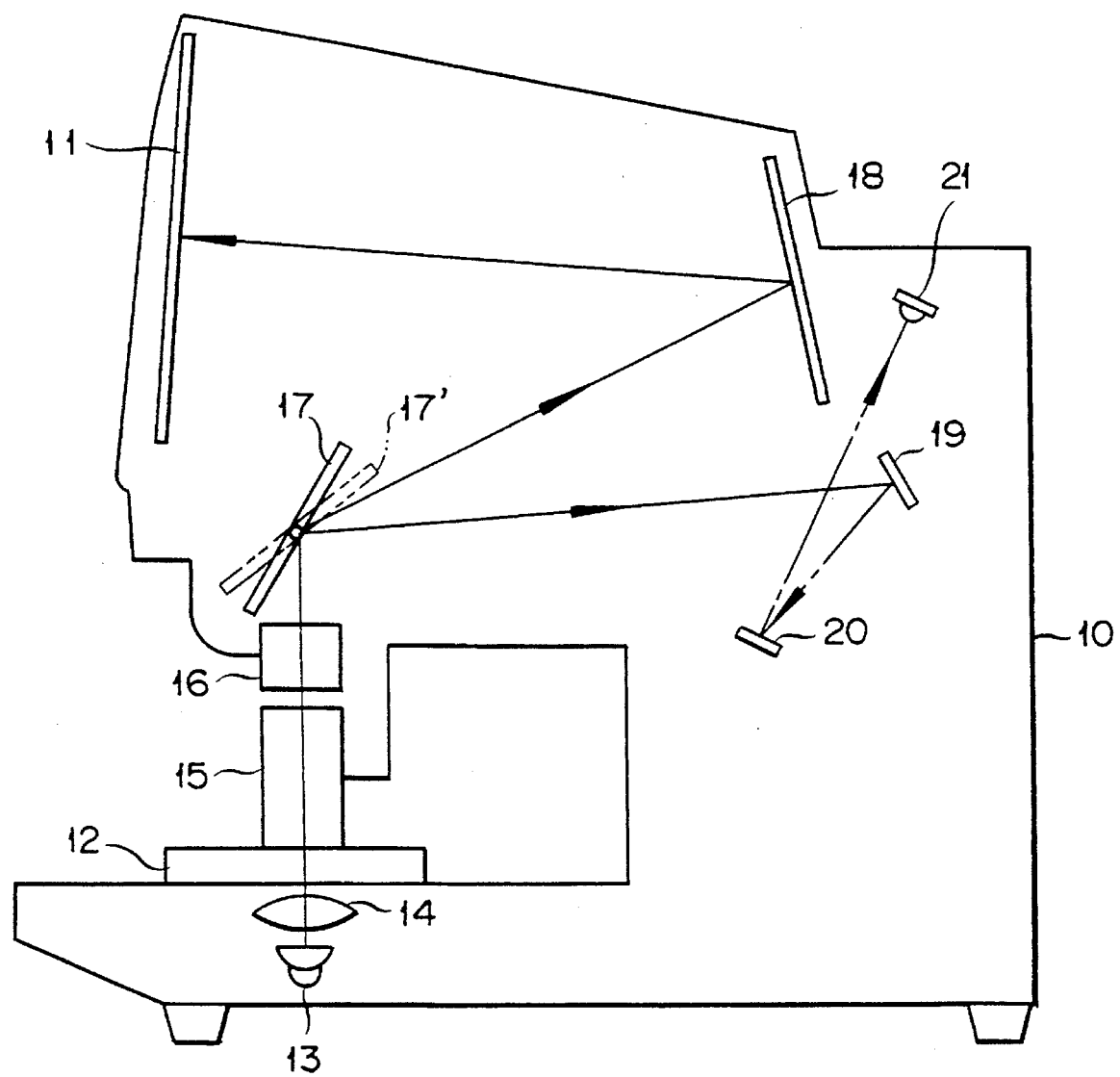
FIG. 2 is a cross section showing the inner construction of a reader scanner shown in FIG. 1.

FIG. 2 is a cross section showing the inner construction of the reader scanner 2 shown in FIG. 1. As illustrated in the diagram, a housing 10 of the reader scanner 2 is provided on the front side thereof with a screen 11. Below the screen 11, a microfilm omitted from illustration is loaded as supported in a microfilm carrier 12. A light source (such as, for example, a halogen lamp) 13 is incorporated in the lower part of the housing 10. A beam of light emitted from this light source 13 is condensed by a condenser lens 14 and projected on the microfilm. On the microfilm carrier 12, a projecting lens 15 and a prism 16 for rotating an image are sequentially disposed in the order mentioned. A scanning mirror 17 is rotatably disposed on the image-rotating prism 16. This scanning mirror 17 functions to scan an image on the microfilm while in the scanning mode in addition to switching a reader-oriented light path (solid line) and a scanner-oriented light path (line of alternate one-long and two-short dashes). For the purpose of causing the beam of light which has been passed through the microfilm and reflected on the scanning mirror 17 to be projected on the screen 11, a reflecting mirror 18 is fixed in the reader-oriented light path. For the purpose of electrically reading images photographed in the microfilm, reflecting mirrors 19 and 20 and a line sensor 21 such as, for example, a CCD are disposed sequentially in the order mentioned in the scanner-oriented light path. The line sensor 21 is formed of a photoelectric conversion element.

The reader scanner 2 constructed as described above operates roughly as follows. When the power source is turned on, the reader mode is selected and the scanning mirror 17 is turned to the position for the reader-oriented light path. As a result, the beam of light from the light source 13 is condensed by the condenser lens 14 and allowed to illuminate the microfilm loaded in the microfilm carrier 12. The image photographed in the microfilm is forwarded sequentially by the projecting lens 15, the image-rotating prism 16, the scanning mirror 17, and the reflecting mirror 18 and projected as magnified on the screen 11 for viewing. For the purpose of printing on a paper the image of an original document (the original image) projected on the screen 11 as described above, a command to read is injected into the reader scanner 2 by the operation of a relevant key on an operating panel omitted from illustration to switch the reader scanner 2 to the reading mode and turn the scanning mirror 17 to the position for the scanner-oriented light path. As a result, the image of the microfilm illuminated by the beam of light from the light source 13 is forwarded sequentially by the projecting lens 15, the image-rotating prism 16, a scanning mirror 17', and the reflecting mirrors 19 and 20 and brought to the photoelectric conversion element 21 and converted therein to an electrical image signal through photoelectric conversion. This image signal, though omitted from illustration, is emitted via a sample hold amplifying circuit out of an A/D converter and a comparator and injected into an optical disc memory device or a laser beam printer 3, for example.

Figure 3:
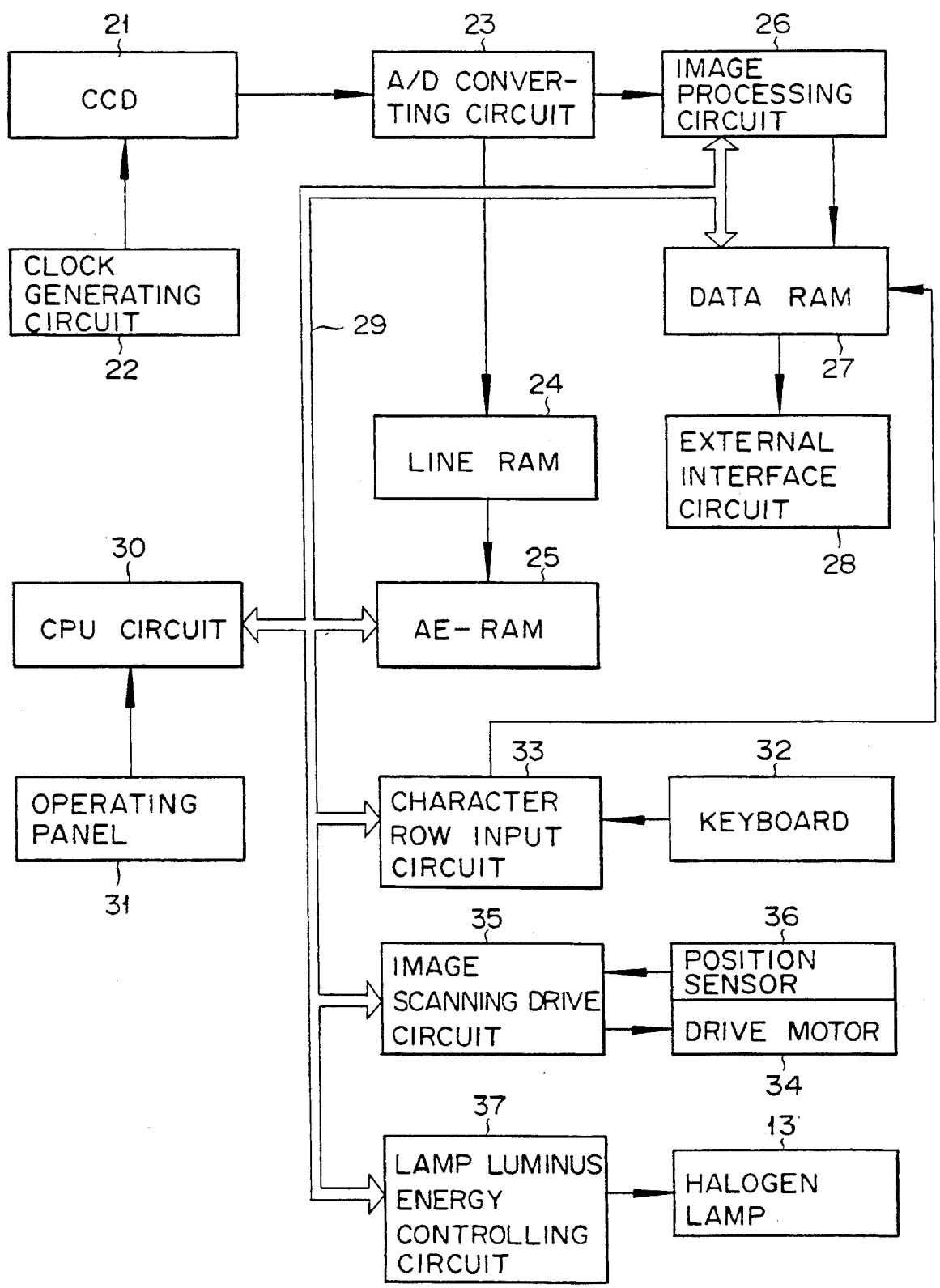
FIG. 3 is a block diagram showing a control circuit of the reader scanner shown in FIG. 1.

FIG. 3 is a block diagram showing a control circuit of the reader scanner 2 constructed as described above. To the CCD 21 which functions as a line sensor, a clock generating circuit 22 for supplying a clock signal of a prescribed frequency to the CCD 21 is connected and an A/D converting circuit 23 for binarizing the analog signal of the image data from the CCD 21 and converting it into a digital signal is also connected. The digital signal which results from the conversion in the A/D converting circuit 23 is sampled and received in a memory medium of a line RAM 24 for storing one line full of image data, then supplied to a memory medium of an AE-RAM 25 for storing one image plane full of image data, and simultaneously forwarded to an image processing circuit 26 for implementing various image processing. The data which have undergone the image processings in the image processing circuit 26 are supplied to the memory medium of a data RAM 27 and is transferred via an external interface circuit 28 to the laser beam printer 3 and to such an external output device as an optical disc. Such memory media as the AE-RAM 25 and the data RAM 27 and the image processing circuit 26 are connected via a system bus 29 to a CPU circuit 30. An operating panel 31 for operating the image reading apparatus is connected to the CPU circuit 30.

To a keyboard 32 for injecting a row of characters such as characters and figures of date and time, for example, to be used for synthesizing a previously introduced microimage with another image which is the row of characters mentioned above, a character row input circuit 33 for developing the introduced row of characters on a bit map is connected. To a drive motor 34 which drives the scanning mirror 17 for the purpose of scanning the image, an image scanning drive circuit 35 for controlling the operation of the drive motor 34 is connected. To this image scanning drive circuit 35 is connected a position sensor 36 which is attached to the drive motor 34 and adapted to detect the rotating position of the scanning mirror 17. A lamp luminous energy controlling circuit 37 for controlling the luminous energy of the halogen lamp 13 as a light source is connected to this halogen lamp 13. The CPU circuit 30 is connected via the system bus 29 to these circuits 33, 35, and 37. The device for injecting the row of characters does not need to be limited to the keyboard 32. A personal computer may be used instead.

The CPU circuit 30 is adapted to transmit control signals for controlling various operations via the system bus 29 to the AE-RAM 25, the image processing circuit 26, the data RAM 27, the character row input circuit 33, the image scanning drive circuit 35, and the lamp luminous energy controlling circuit 37 and, at the same time, implement various arithmetic operations. To be more specific, for the purpose of attaining synthesis of the introduced microimage with the row of characters without inducing the occurrence of a missing part in the output image, the CPU circuits 30, as will be more specifically described hereinbelow, carries out such processings as discriminating a microimage from the image data in the AE-RAM 25, comparing the part of a margin of a sheet appearing as the difference between the sheet and the microimage with the row of characters, and consequently determining the position for printing the row of characters to be used in the synthesis, the amount of shift of the microimage, and the ratio of magnification of image by arithmetic operations.

Now, the operation of the image reading apparatus which is constructed as described above will be explained below with reference to the flow charts shown in FIG. 4 and FIG. 5.

Figure 6A:
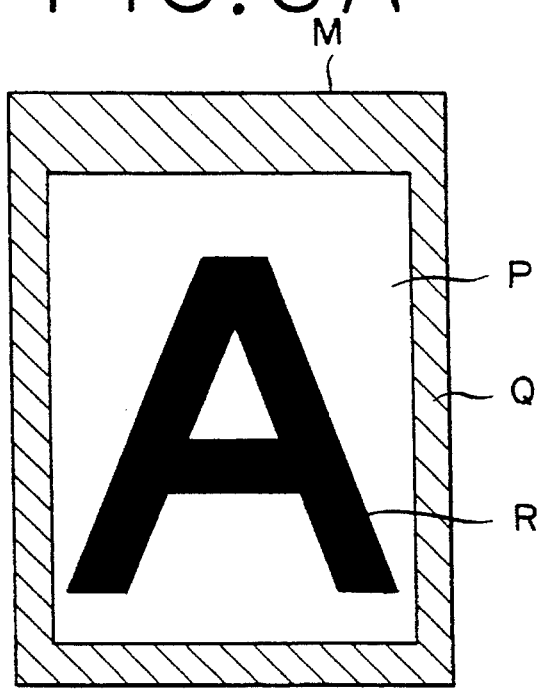
FIG. 6 is a diagram to aid in the explanation of areas of a microimage.
Figure 6B:
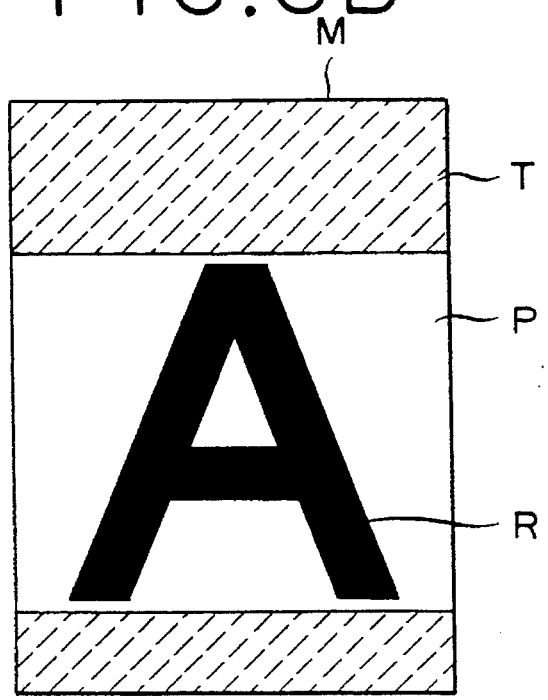

Here, it will be given a definition of some terms used in the following explanations with reference to FIG. 6A and FIG. 6B. The term "original image P" refers to an image reproduced in consequence of the reading of an original document which is composed of a part of characters or figures and a background thereof and the term "image area R" refers to the area occupied by such characters or figures. Here, the term "non-original image Q" refers to the part which corresponds to the part of a margin appearing on a sheet M when the original image P is printed on the sheet M and the term "non-image area T" refers to the part appearing as the difference between the part of characters or figures (image area R) and the sheet M when the original image P is printed on the sheet M.

Figure 4:
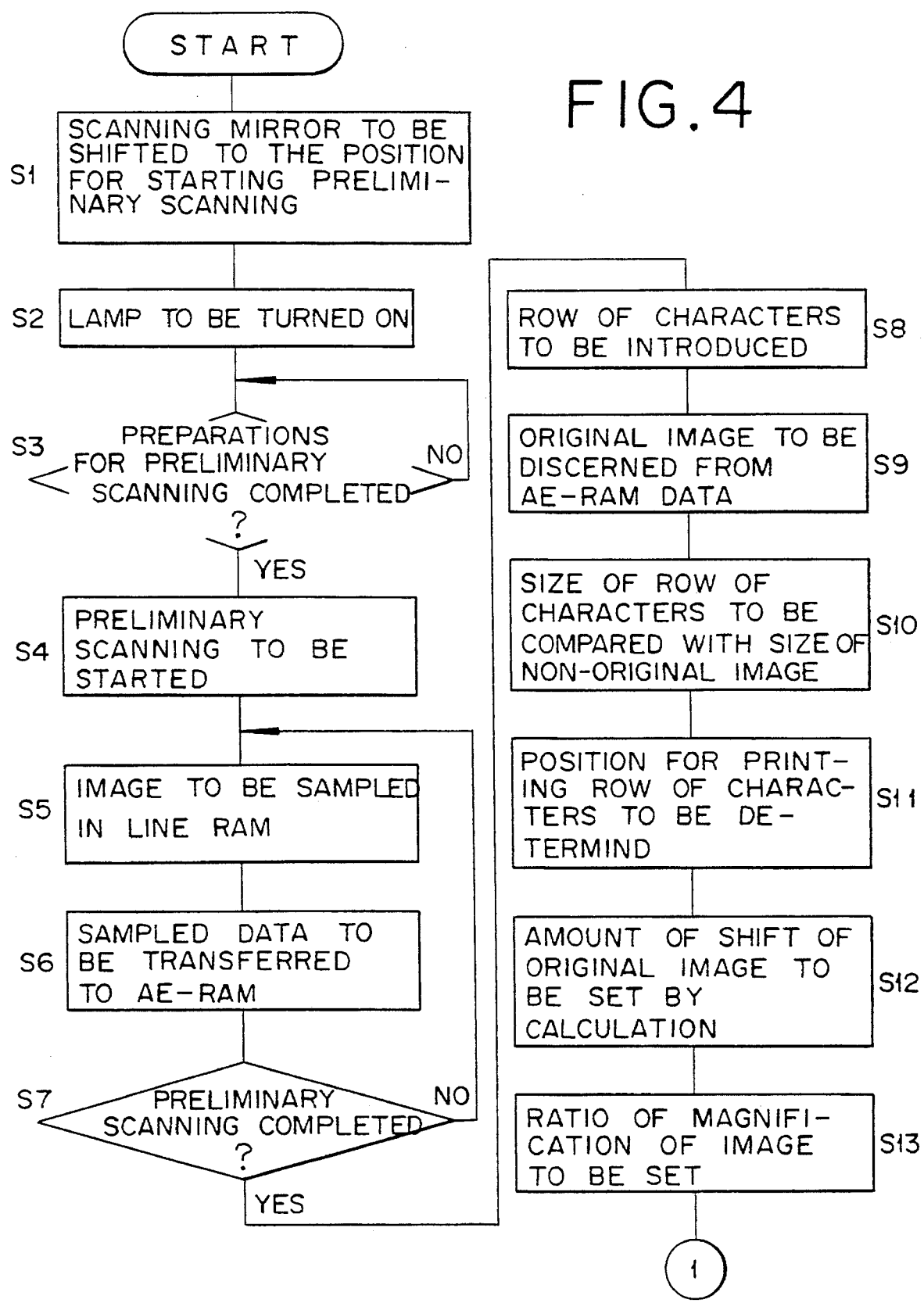
FIG. 4 is a flow chart showing one example of the operation of the image reading apparatus of this invention.
Figure 5:
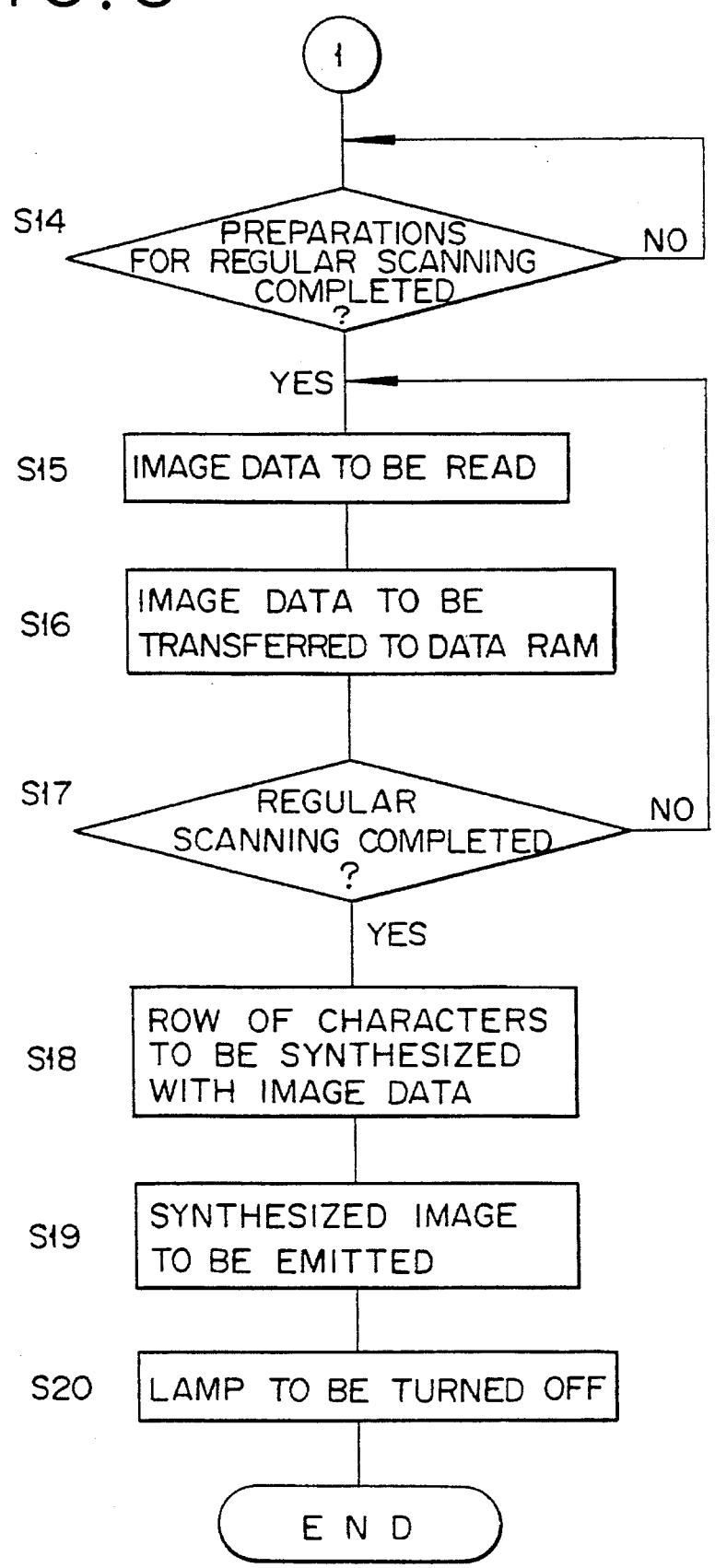
FIG. 5 is a flow chart showing a continuation of FIG. 4.

The embodiment under consideration contemplates performing a preliminary scanning for examining the state of reading out the image of a selected one of the original documents contained in the microfilm prior to the regular scanning for the purpose of obtaining parameter data proper for the reading of an image and the synthesis of the image as shown in FIG. 4 and FIG. 5.

When the operator injects a command to read into the CPU circuit 30 through the medium of the operating panel 31, the CPU circuit 30 sets the drive motor 34 to actuating through the medium of the image scanning drive circuit 35 so as to switch on the read mode, switches the scanning mirror 17 to the position of the scanner-oriented light path, and at the same time shifts it to the position for starting the preliminary scanning (S1). Then, the CPU circuit 30, on discerning from the signal of the position sensor 36 the fact that the scanning mirror 17 has moved to the prescribed position for starting the preliminary scanning, turns on the halogen lamp 13 through the medium of the lamp luminous energy controlling circuit 37 (S2) and judges whether or not the preparations for the preliminary scanning have been completed (S3).

When the completion of the preparations for the preliminary scanning is confirmed by the judgment at the step S3, the CPU circuit 30 sets the drive motor 34 to actuating through the medium of the image scanning drive circuit 35 to start the preliminary scanning and causes the scanning mirror 17 to make a scanning motion to read the image (S4). At this time, the original image of the microfilm which is illuminated by the beam of light from the halogen lamp 13 is forwarded sequentially through the projecting lens 15, the image rotating prism 16, the scanning mirror 17', and the reflecting mirrors 19 and 20 and read in by the line sensor of the CCD 21 as described previously. The analog signal of the image which has been read in by the CCD 21 is binarized and converted into a digital signal by the A/D converting circuit 23 and then sampled and received in the memory medium of the line RAM 24 (S5). Further, the sampled image data in the line RAM 24 is transferred to the memory medium of the AE-RAM 25 (S6). The operations of the steps S5 and S6 are executed repeatedly until the completion of the preliminary scanning is discerned (S7).

When the preliminary scanning is completed, the CPU circuit 30 causes the row of characters introduced via the keyboard 32 to be developed into a bit map in the character row input circuit 33 and then detects the size (width) of the row of characters from the length, the number of lines, etc. which show in the bit map (S8). Then, it discerns a read original image (microimage) P from the image data stored in the memory medium of the AE-RAM 25 and detects the size (width) of a non-original image Q outside the original image (microimage) P (refer to FIG. 6A) (S9). It subsequently proceeds to compare the detected size of the row of characters with the size of the non-original image Q outside the original image (microimage) P (S10), determines the position for printing the row of characters to be used for the synthesis based on the result of the comparison (S11), sets by calculation the amount of shift of the original image (microimage) P (S12), and further sets the ratio of magnification of the image (S13). A concrete example of this series of processings will be explained herein below with reference to diagrams. The CPU circuit 30 determines the luminous energy of the halogen lamp 13 and the variables for the image processing based on the image data stored in the memory medium of the AE-RAM 25 and judges whether or not the preparations for the regular scanning have been completed (S14).

When the completion of the preparations for the regular scanning is confirmed in consequence of the judgment at the step S14, the CPU circuit 30 sets the drive motor 34 actuating through the medium of the image scanning drive circuit 35 to start the regular scanning, causes the scanning mirror 17 to produce a scanning motion, and effects the reading of the original image by the use of the line sensor of the CCD 21 (S15). The analog signal of the image read out by the CCD 21 is binarized and converted into a digital signal by the A/D converting circuit 23, subjected to image processings by the image processing circuit 26, and transferred to the memory medium of the data RAM 27 (S16). The operations of the steps S15 and S16 are executed repeatedly until the completion of the regular scanning is discerned (S17).

When the regular scanning is completed, the CPU circuit 30 transfers the bit map data of the row of characters in the character row input circuit 33 to the data RAM 27 and causes them to be synthesized with the image data (S18). Then, it emits the synthesized image through the medium of the external interface circuit 28 to the laser beam printer 3 and to such an external output device as an optical disc (S19). Subsequently, it turns off the halogen lamp 13 through the medium of the lamp luminous energy controlling circuit 37 (S20) and completes the series of operations.

Figure 13A:
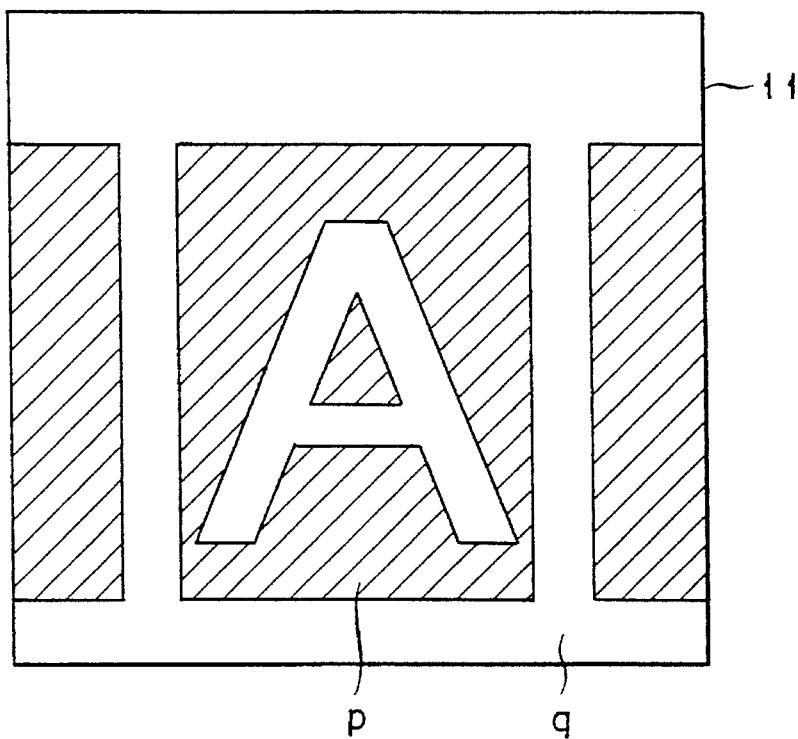
FIG. 13 is a diagram to aid in the explanation of the conventional synthesis of image.
Figure 13B:
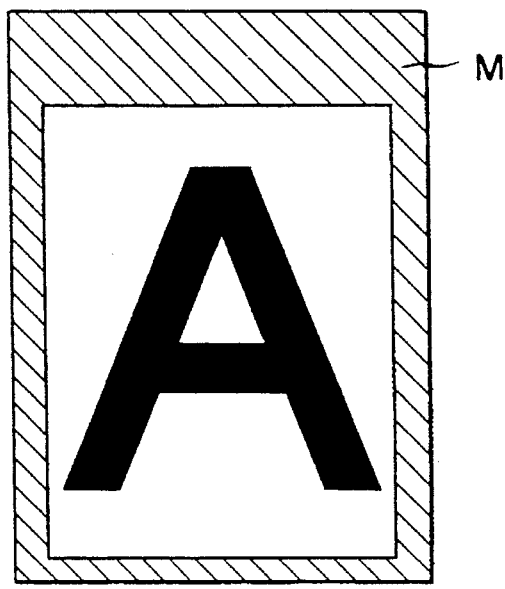
Figure 13C:
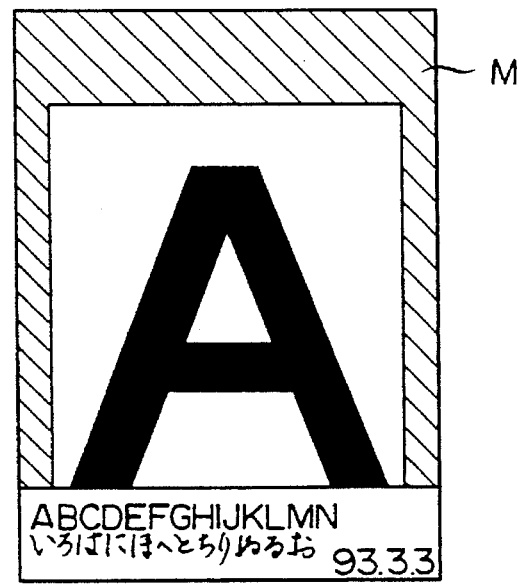

Now, concrete examples of the processings of the steps S9 through S13 described above will be explained below with reference to FIGS. 7 to 11. Invariably in these drawings, the diagram A represents a microimage projected on a screen 11, the diagram B a microimage read out during the course of the preliminary scanning, and the diagram C a synthetic image obtained by the synthesis of a row of characters after the regular scanning. The parts shared by FIG. 6 and FIG. 13 are denoted by like reference numerals.

Figure 7A:
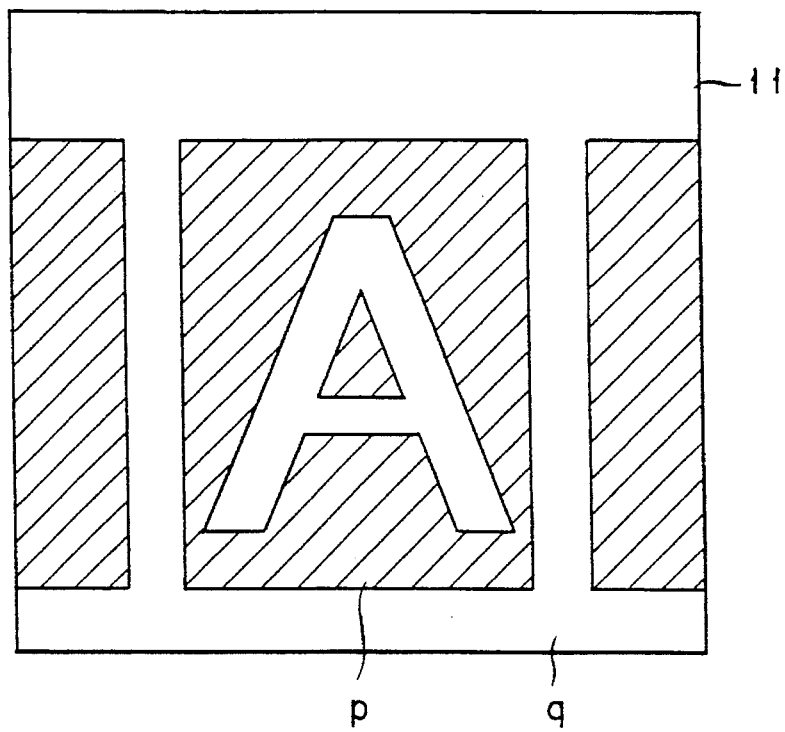
FIGS. 7 to 11 are diagrams each to aid in the explanation of a processing for the synthesis of a microimage with a row of characters.
Figure 7B:
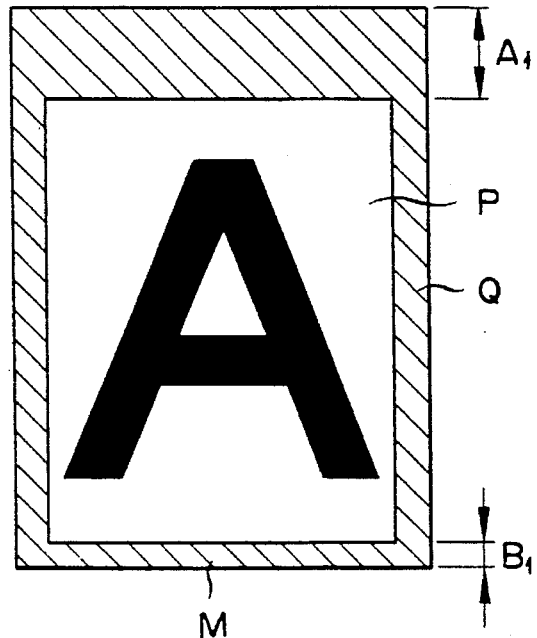
Figure 7C:
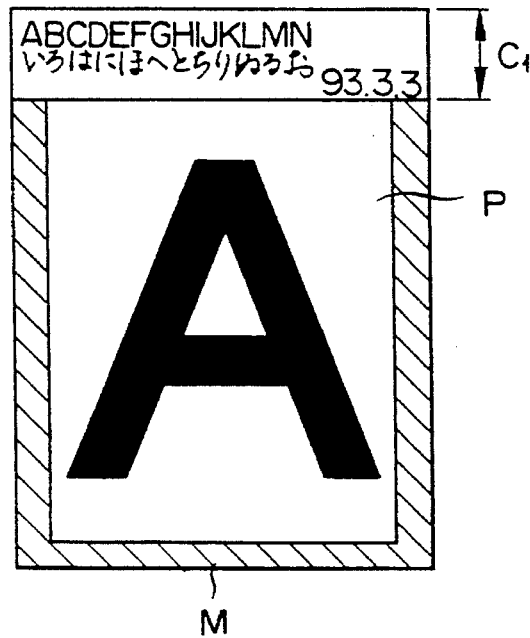

First, the explanation will be made of the example shown in FIG. 7. In consequence of the preliminary scanning, such image data as are shown in FIG. 7B are stored in the memory medium of the AE-RAM 25. The CPU circuit 30 discerns the read microimage (original image) P from the image data and, based on the result of this discernment, calculates the sizes $A_1$ and $B_1$ of the non-original image Q outside the microimage (original image) P (S9). It then compares the results $A_1$ and $B_1$ of the calculation with the size $C_1$ of the row of characters (S10). In this case, the relation of magnitude of $B_1<C_1<A_1$ exists. Since the size $A_1$ of the non-original image Q on the upper side of the microimage (original image) P is larger than the size $C_1$ of the row of characters, the synthesis of the row of characters to the non-original image Q on the upper side of the microimage (original image) P (S11) has no possibility of suffering the row of characters to overlap the microimage (original image) P and consequently giving rise to a synthetic image betraying a missing part therein. The synthetic image which is consequently obtained appears as shown in FIG. 7C, for example.

Figure 8A:
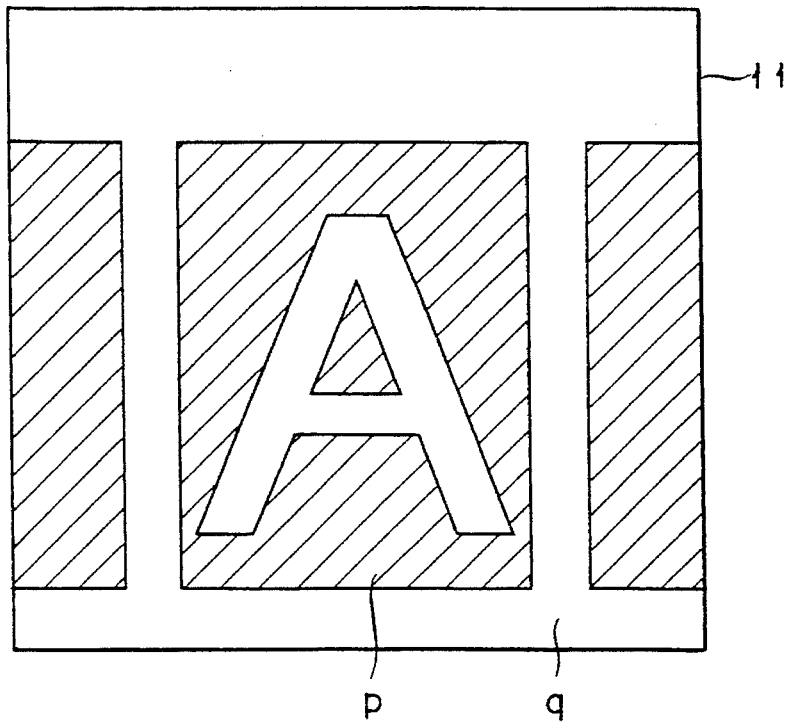
Figure 8B:
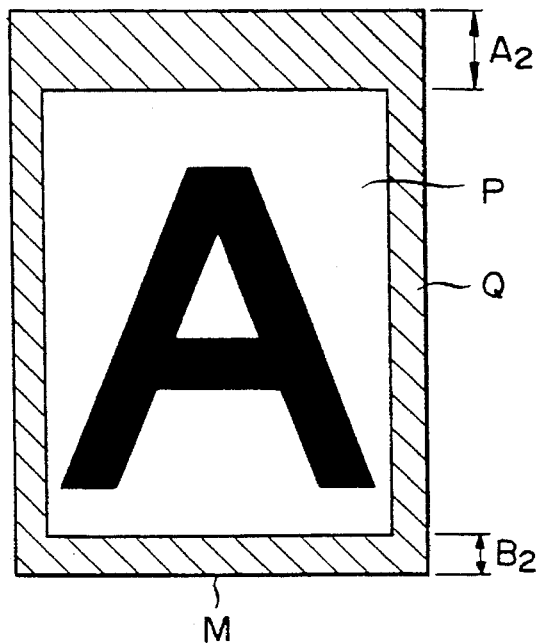
Figure 8C:
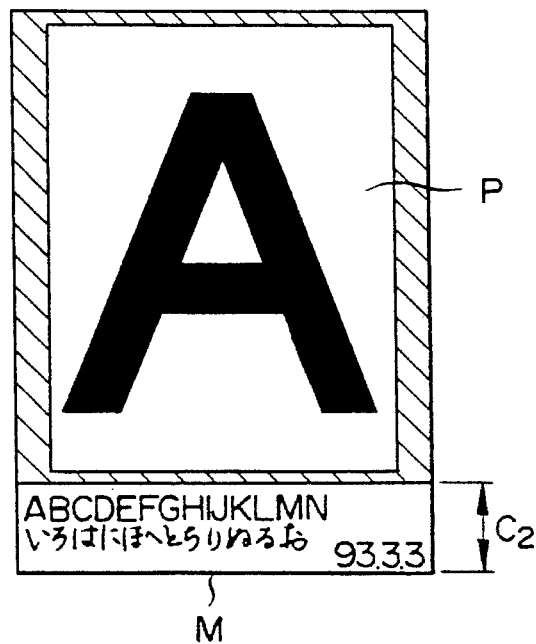

In the example shown in FIG. 8, the sizes $A_2$ and $B_2$ of the non-original image Q and the size $C_2$ of the row of characters are such as to satisfy the relations of magnitude, $B_2<A_2<C_2$ and $C_2<(A_2+B_2)$. When the microimage (original image) P and the row of characters are inadvertently synthesized, therefore, the synthesis has the possibility of suffering the row of characters to overlap the microimage (original image) P and consequently producing a synthetic image betraying a missing part therein. In this case, therefore, the microimage (original image) P is shifted so that the size of the non-original image Q on the side destined to be synthesized with the row of characters may be larger than the size of the row of characters. To be more specific, the microimage (original image) P is shifted upwardly by an amount not exceeding the size $A_2$ of the non-original image Q on the upper side of the microimage (original image) P in this case (S12). The synthetic image which is obtained by synthesizing the row of characters with the shifted image has an appearance as shown in FIG. 8C, for example. The means to cause this shift of the microimage (original image) P will be specifically described hereinbelow.

Figure 9A:
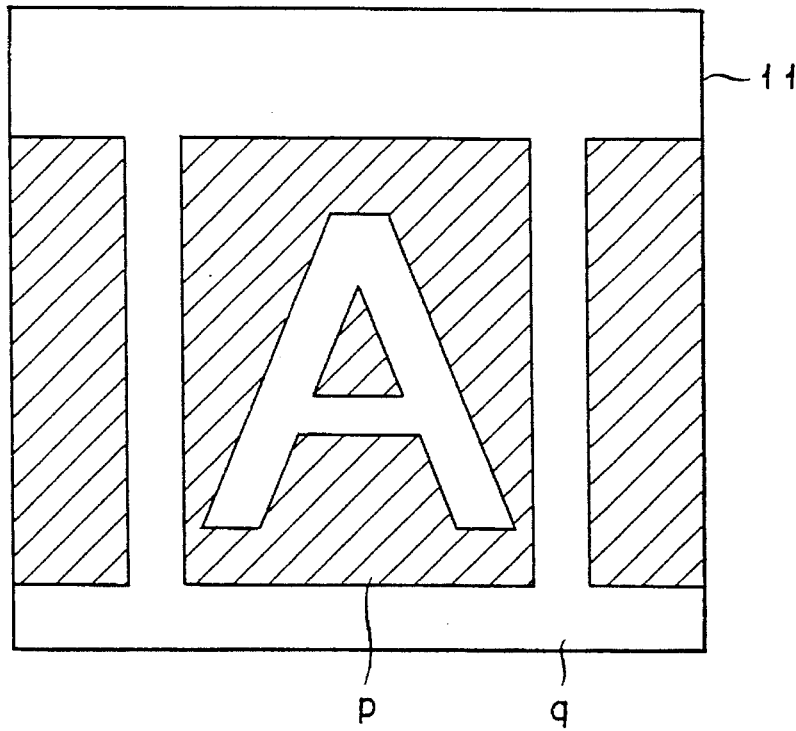
Figure 9B:
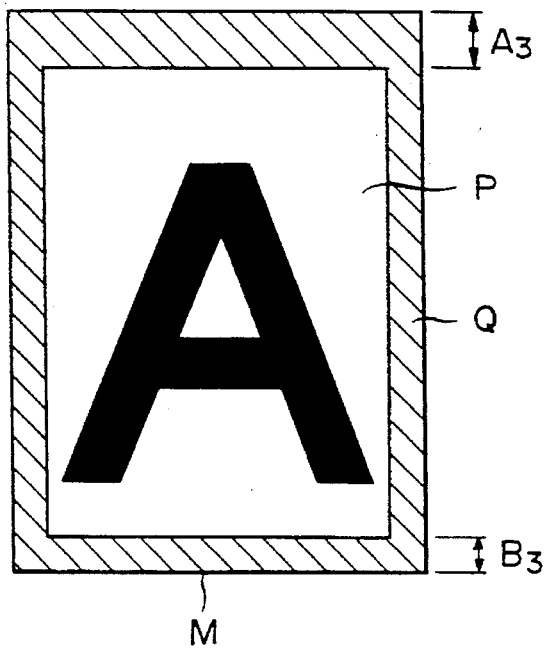
Figure 9C:
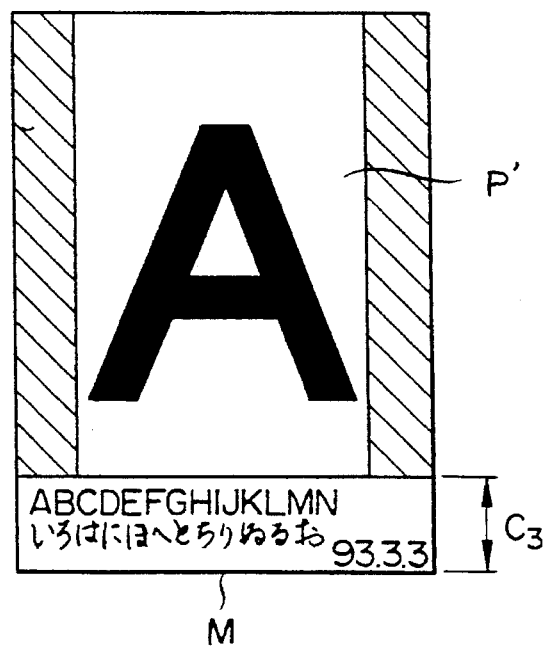

In the example shown in FIG. 9, the sizes $A_3$ and $B_3$ of the non-original image Q outside the microimage (original image) P and the size $C_3$ of the row of characters are such as to satisfy the relations of magnitude, $B_3<A_3<C_3$ and $(A_3+B_3)<C_3$. If the microimage (original image) P is merely shifted in the same manner as in the example of FIG. 8, the possibility of the microimage (original image) P and the row of characters overlapping each other and the synthetic image betraying a missing part therein will ensue. In this example, therefore, the microimage (original image) P is contracted until the non-original image grows to a size enough to allow synthesis of the row of characters therein. To be more specific, the microimage (original image) P is contracted at a ratio of reduction of not more than $(A_3+B_3)/C_3$ (S13). The contracted microimage (original image) P' is shifted when necessary so that the size of the non-original image on the side for synthesizing the row of characters may surpass the size of the row of characters. The synthetic image which is consequently obtained in this case has an appearance as shown in FIG. 9C. The contraction of the microimage (original image) P may be implemented by a method which resorts to adjustment of the magnification by the use of the projecting lens 15 during the course of the regular scanning or by a method which resorts to the operation of contracting the image in the image processing circuit 26.

Figure 10A:
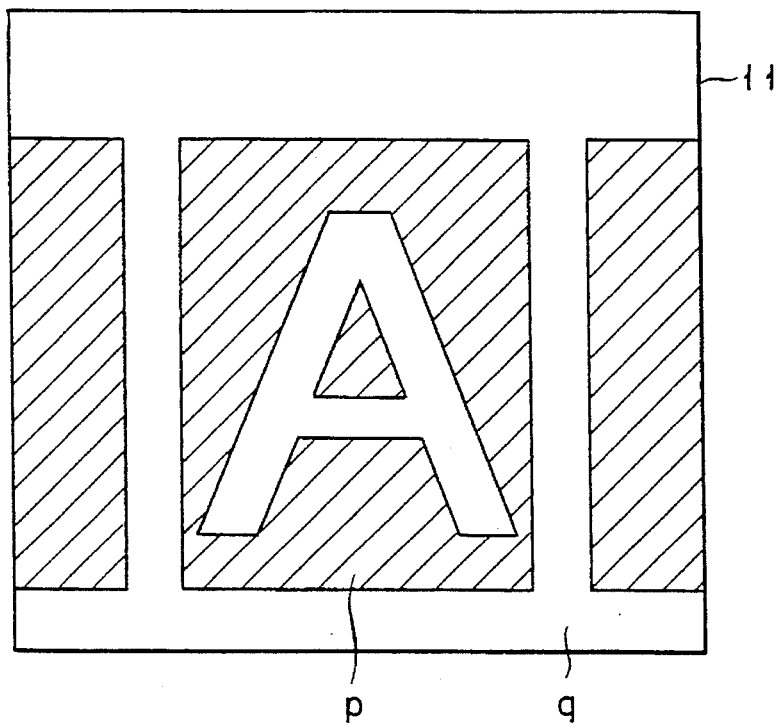
Figure 10B:
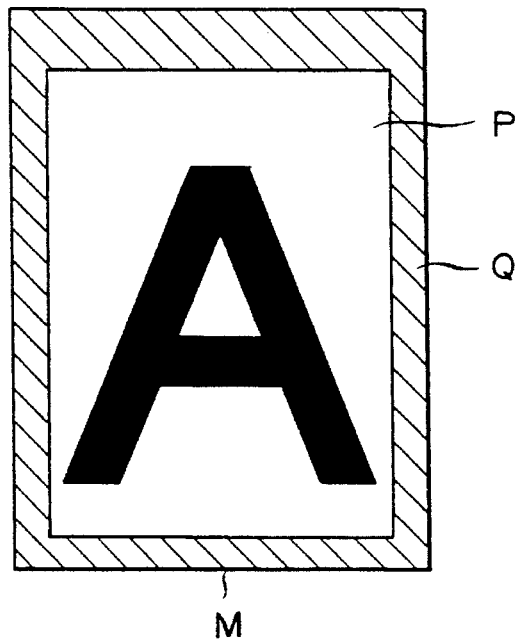
Figure 10C:
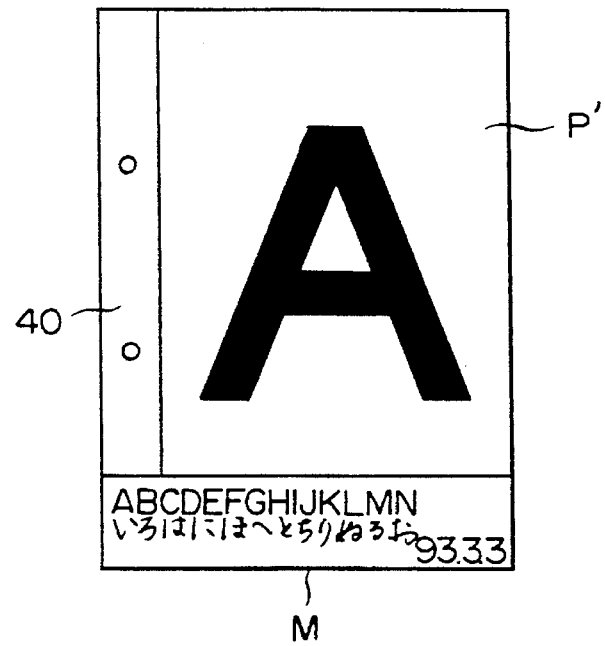

FIG. 10 depicts an example of providing a synthetic image with a margin for filing. In this case, the microimage (original image) P is either shifted in the vertical or the horizontal direction or contracted so as to impart the margin 40 for filing to the synthetic image as shown in FIG. 10C. Then the row of characters is synthesized at the consequently decided position for printing.

Figure 11A:
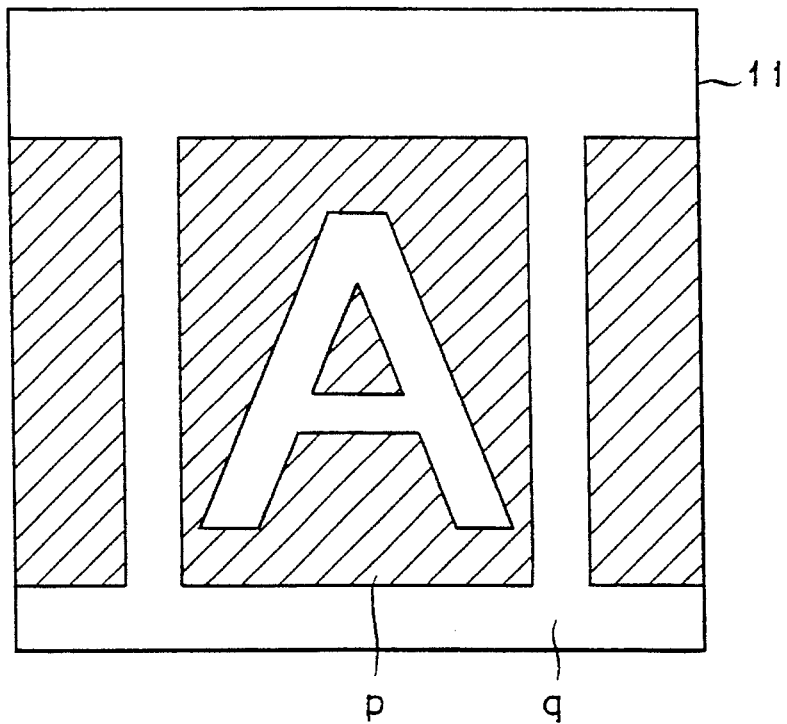
Figure 11B:
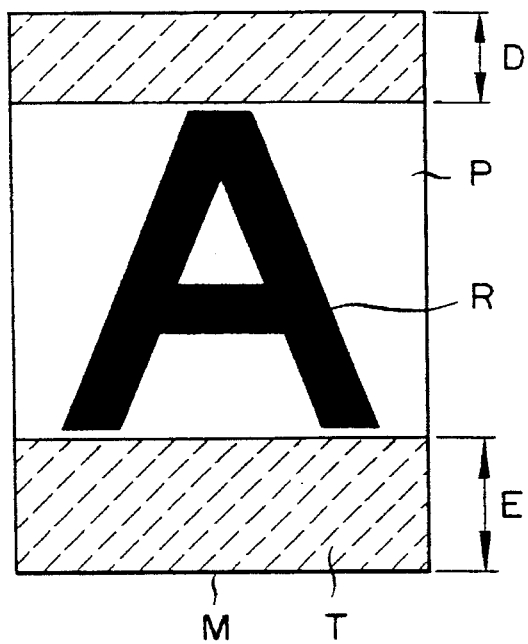
Figure 11C:
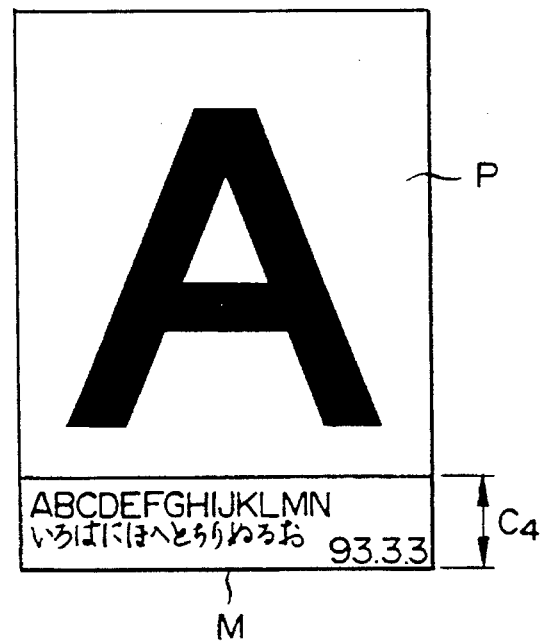

FIG. 11 illustrates still another example. In the case of a microfilm, some of the images photographed therein require to be copied as equally magnified. In this case, the image P which has been read out as shown in FIG. 11B contains virtually no non-original image and, therefore, rejects the operation of shifting or magnification which would be performed in the non-original image Q outside the microimage (original image) P in the example described above. In the present case, therefore, the CPU circuit 30 discriminates a non-image area T (the part other than the image area R) present in the microimage (original image) P as shown in FIG. 11B and, based on the result of the discrimination, calculates the sizes D and E of this non-image area T. The processing which follows this operation of the CPU circuit 30 is similar to that of the example described above. Specifically, this processing comprises comparing the sizes D and E of the non-image area T with the size $C_4$ of the row of characters, deciding on the basis of the result of the comparison the area for synthesis of the row of characters so that the image area R of the microimage (original image) P may not overlap the row of characters. Where the relation of magnitude, $D<C_4<E$, is satisfied, it suffices simply to have the row of characters synthesized in the non-image area T on the lower side of the microimage (original image) P (refer to FIG. 11C). Otherwise, the microimage (original image) P is shifted by a suitable amount (when D, $E<C_4$ and $C_4<(D+E)$) or contracted by a suitable ratio of reduction (when D, $E<C_4$ and $(D+E)<C_4$) so that the image area R of the microimage (original image) P may not overlap the row of characters. After the microimage (original image) P has been contracted, there are times when this contracted microimage will be further required to be shifted. This example does not need to be limited to the images in the microfilm but may be applied to ordinary original documents using no outer frame.

As yet another example, the combination of the first example (the case of using the non-original image Q) and the second example (the case of using the non-image area T within the original image P) may be cited. In this case, when the size of the non-original image outside the original image (microimage) is larger than the size of the row of characters, for example, the original image (microimage) is shifted within the size of the non-original image outside the original image (microimage). When the size of the non-original image outside the original image (microimage) is smaller than the size of the row of characters, it suffices to shift the original image (microimage) to an extent allowed by the size of the non-image area within the original image (microimage). When the size of the row of characters is larger than the size of the non-image area in the original image (microimage) area, the original image (microimage) is contracted (occasionally further shifted) so as to prevent the image area from overlapping the row of characters.

The examples described thus far concern the synthesis of a row of characters to a microimage. This invention does not need to be limited to the synthesis of this particular manner. It may be alternatively embodied in synthesizing images, instead of the row of characters, which are severally read out by different reader scanners or images which are read out separately of each other by one and the same reader scanner 2.

In the preceding examples, when contraction is required, it is effected on the microimage. Of course, this invention allows this contraction to be effected on the row of characters instead.

Finally, an example of the means to be used for shifting the original image (microimage) P will be explained below. The data RAM 27 has a capacity for storing at least one picture plane full of image data. In the case of binary data, it stores the data as divided into lines each of 8,192 bits (400 h bytes). In the case of multi-valued data, the data RAM 27 may possibly require a larger capacity. The data RAM 27 has addresses labeled therein each for eight bits. When image data are to be emitted to the external interface circuit 28, the relevant bits are read out sequentially in the increasing order of address numbers from the least significant address number.

Figure 12:
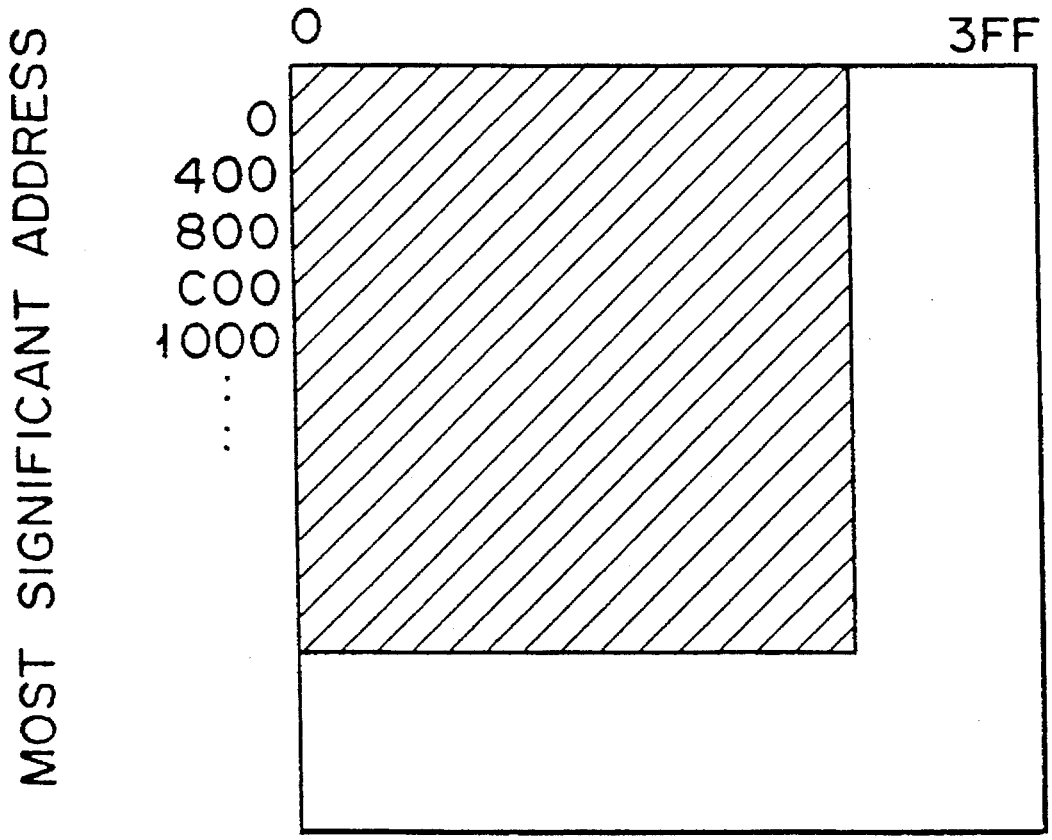
FIG. 12 is a diagram showing a memory map for a data RAM.

When the image at the head of the next main scanning line is to be emitted, the data RAM 27 zeros the ten bits in the least significant address, adds 1 to the 10th bit of the address (namely by adding 400 h to the address), and starts reading the data from that address onward. As a result, the hatched area of the memory map shown in FIG. 12 constitutes itself the area to be printed out as it is. The shift of the image is realized as by changing the relevant address to be written in the data RAM 27. For the purpose of shifting the image to the right, for example, the 10 bits of the least significant address of the data RAM 27 are changed not to 0 but to the numerical value corresponding to the amount of shift when the image data at the head of each main scanning line are written in. For the purpose of shifting the image upwardly, the data RAM 27 is caused to start writing the data from the address 0 onward after the elapse of a time equivalent to the amount of shift following the start of scanning.

In the image reading apparatus described above, the synthesis of a row of characters as a separate image to a original image (microimage) P read out previously is accomplished by a procedure which comprises either discriminating the original image (microimage) P and calculating the size of the non-original image Q thereof (refer to FIGS. 7 to 10) or discriminating the image area R of the original image (microimage) P and calculating the size of the non-image area T thereof (refer to FIG. 11), comparing the size so calculated with the size of the row of characters, and shifting the original image (microimage) or contracting the original image (microimage) or the row of characters based on the result of the comparison so as to prevent the original image (microimage) P or the image area R from overlapping the row of characters thereby forming a non-original image or a non-image area larger than the size of the row of characters to be synthesized. As a result, the row of characters as the separate image is automatically synthesized to the non-original image or the non-image area which is larger than the size of the row of characters and the resultant synthetic image is emitted as an output. Thus, the operator of the apparatus is enabled to synthesize the row of characters as the separate image to the original image (microimage) and give rise to a synthetic image betraying no missing part without paying any heed to the size of the image to be read out, the margin of the image, the position for reading out the image, and the length of the row of characters to be synthesized and the number of lines of the characters.

Incidentally, the present example represents a case of reading out original documents from a microfilm. This invention does not need to be limited to the microfilm as a source of image data. It can be applied to a digital copying apparatus which is adapted to read out ordinary original documents.

Incidentally, the present example, in most cases, is a portrayal of a case of having effected the synthesis of the original image such as a microimage which has been read out with a separate image such as a row of characters by having the separate image contained by way of synthesis in the part underlying the original image or the image area. Optionally, the part for having the separate image contained for synthesis may overlie the original image or the image area instead as in the case of FIG. 7.

What is claimed is:

1. An image reading apparatus for synthesizing an original image composed of an image area and a non-image area with a separate image and emitting the synthesized image in such a manner as to be printed on a sheet, comprising:

a detector which detects a width of a margin outside the image area appearing as the difference between the sheet and the image area inside the original image when the original image is printed on the sheet;

a comparator which compares a width of the separate image subjected to synthesis with the width of the margin outside the image area detected by said detector; and a controller which shifts and emits as an output the position for printing the image area within the original image based on the result of the comparison by said comparator.

2. An apparatus according to claim 1, wherein the width of the margin outside the image area is the total width of the area including the non-image area within the original image and the area outside the original image appearing as the difference between the sheet and the original image.

3. An apparatus according to claim 1, wherein the shift of the image area within the original image by said controller is executed by altering the address of writing when the relevant data are written in a memory.

4. An apparatus according to claim 1, wherein the separate image is a row of characters such as characters and figures indicating date and time and is inputted from an external device.

5. An apparatus according to claim 1, wherein the width of the margin outside the image area detected by said detector occurs along the vertical edges of the image area.

6. An apparatus according to claim 5, wherein the range in which the image area is to be shifted by said controller is within the width of the margin outside the image area occurring along the vertical edges of the image area.

7. An apparatus according to claim 6, which further comprises a magnifying mechanism for contracting the image area within the original image or the separate image and effecting the contraction of the image area or the separate image when the width of the separate image is larger than the total of the width of the margin outside the image area occurring along the vertical edges of the image area.

8. An apparatus according to claim 7, wherein said magnifying mechanism includes a projecting lens.

9. An image reading apparatus for synthesizing an original image composed of an image area and a non-image area with a separate image formed of a row of characters and emitting the synthesized image in such a manner as to be printed on a sheet, comprising:

a detector which detects a width of a margin outside the image area appearing as the difference between the sheet and the image area within the original image along the vertical edges of the image area;

a comparator which compares a width of the separate image subjected to synthesis with the total of the width of the margin outside the image area occurring along the vertical edges of the image area detected by said detector;

a controller which shifts and emits as an output the position for printing the image area inside the original image within the width of the margin outside the image area based on the result of the comparison by said comparator; and a magnifying mechanism which contracts the image area or the separate image when the width of the separate image is larger than the total of the width of the margin outside the image area.

10. An apparatus according to claim 9, wherein the width of the margin outside the image area is the total width of the area including the non-image area within the original image and the area outside the original image appearing as the difference between the sheet and the original image.

11. An apparatus according to claim 9, wherein the shift of the image area by said controller is executed by altering the address of writing when the relevant data are written in a memory.

12. An apparatus according to claim 9, wherein said magnifying mechanism includes a projecting lens.

* * * * *